(12) United States Patent
Czachor et al.

(10) Patent No.: US 6,619,913 B2
(45) Date of Patent: Sep. 16, 2003

(54) FAN CASING ACOUSTIC TREATMENT

(75) Inventors: Robert Paul Czachor, Cincinnati, OH (US); Paul Michael Smith, Loveland, OH (US); Robert Eugene Kraft, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/076,527

(22) Filed: Feb. 15, 2002

(65) Prior Publication Data

US 2003/0156940 A1 Aug. 21, 2003

(51) Int. Cl.[7] ............................................. F01D 25/04
(52) U.S. Cl. ..................................... 415/119; 415/173.1
(58) Field of Search ......................... 415/9, 119, 173.1, 415/173.4

(56) References Cited

U.S. PATENT DOCUMENTS

| | | | |
|---|---|---|---|
| 3,542,152 A | * 11/1970 | Adamson | 181/214 |
| 3,948,346 A | 4/1976 | Schindler | 181/33 G |
| 4,417,848 A | * 11/1983 | Dembeck | 415/121.2 |
| 4,452,335 A | * 6/1984 | Mathews et al. | 181/214 |
| 4,475,864 A | 10/1984 | Patacca et al. | 415/9 |
| 4,749,150 A | 6/1988 | Rose et al. | 244/53 B |
| 5,259,724 A | 11/1993 | Liston et al. | 415/9 |
| 5,431,532 A | 7/1995 | Humke et al. | 415/9 |
| 5,486,086 A | 1/1996 | Bellia et al. | 415/9 |
| 5,516,257 A | * 5/1996 | Kasprow et al. | 415/9 |
| 5,543,198 A | 8/1996 | Wilson | 428/116 |
| 5,823,739 A | 10/1998 | Van Duyn | 415/9 |
| 6,182,787 B1 | 2/2001 | Kraft et al. | 181/292 |
| 6,290,455 B1 | 9/2001 | Hemmelgarn et al. | 415/9 |

* cited by examiner

Primary Examiner—Ninh H. Nguyen
(74) Attorney, Agent, or Firm—Pierce Atwood; Nathan D. Herkamp

(57) ABSTRACT

A fan casing for a gas turbine engine is provided which combines the functions of blade containment and noise suppression. The fan casing has an annular metallic inner shell with a plurality of holes are formed therethrough. An acoustic absorber, such as a cellular resonator, is disposed around the inner shell.

12 Claims, 5 Drawing Sheets

FAN CASING ACOUSTIC TREATMENT

BACKGROUND OF THE INVENTION

This invention relates generally to turbofan gas turbine engines and more particularly to fan casings for such engines.

A turbofan gas turbine engine used for powering an aircraft in flight typically includes, in serial flow communication, a fan, a low pressure compressor or booster, a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan and the booster via a second rotor shaft.

The fan includes a plurality of circumferentially spaced apart fan blades extending radially outwardly from a rotor disk that is drivingly connected to the low pressure shaft. Each fan blade generally has an airfoil section and an integral dovetail root section that attaches the blade to the rotor disk. The fan is rotatively supported on a nonrotatable frame, commonly referred to as the fan frame, by a support system that typically includes a number of bearings and bearing support structure.

During engine operation, there is a remote possibility that a foreign body, such as a bird, could impact the fan and cause a fan blade-out event; i.e., part or all of a fan blade becomes detached from the rotor disk. Such a detached fan blade could cause considerable damage to the aircraft powered by the engine if it were not contained by the fan casing. Various containment systems have been developed to prevent such damage. Fan blade containment systems are of two primary types: "hardwall" systems which include an annular containment case manufactured from a high strength material with an adequate shell thickness to absorb the kinetic energy of an impacting fan blade, and "softwall" systems which employ nesting areas defined by inner and outer annular shells having honeycomb structures disposed therein. In addition, ballistic material, such as an aromatic polyamide fiber, may be wrapped around the case structure. Blade fragments are captured in the nesting area and are thus contained within the system and prevented from further contact with other fan blades. Hardwall and softwall containment systems may also be combined.

Prior art fan casings often have provisions for the installation of acoustic panels which absorb noise, such as resonator-type absorbers which include a cellular (e.g. honeycomb) structure covered by a perforated facesheet exposed to the fan flowpath. These acoustic panels are typically installed axially forward and aft of the fan blades, while the portion of the casing axially aligned with the fan blades is designed to define the fan flowpath boundary and to serve as a containment system. In some engine designs, particularly those which do not have a low pressure compressor (or "booster"), the structural configuration of the fan section provides prohibitively small axial space for the installation of these conventional acoustic panels for noise suppression.

Accordingly, there is a need for a fan casing design which combines the functions of blade containment and noise suppression into a limited physical space.

BRIEF SUMMARY OF THE INVENTION

The above-mentioned need is met by the present invention, which provides a fan casing for a gas turbine engine that combines the functions of blade containment and noise suppression. The fan casing has an annular metallic inner shell with a plurality of holes formed therethrough. An acoustic absorber, such as a cellular resonator, is disposed around the inner shell.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification.

The invention, however, may be best understood by reference to the following description taken in conjunction with the accompanying drawing figures in which.

DETAILED DESCRIPTION OF THE INVENTION

Figure 1:
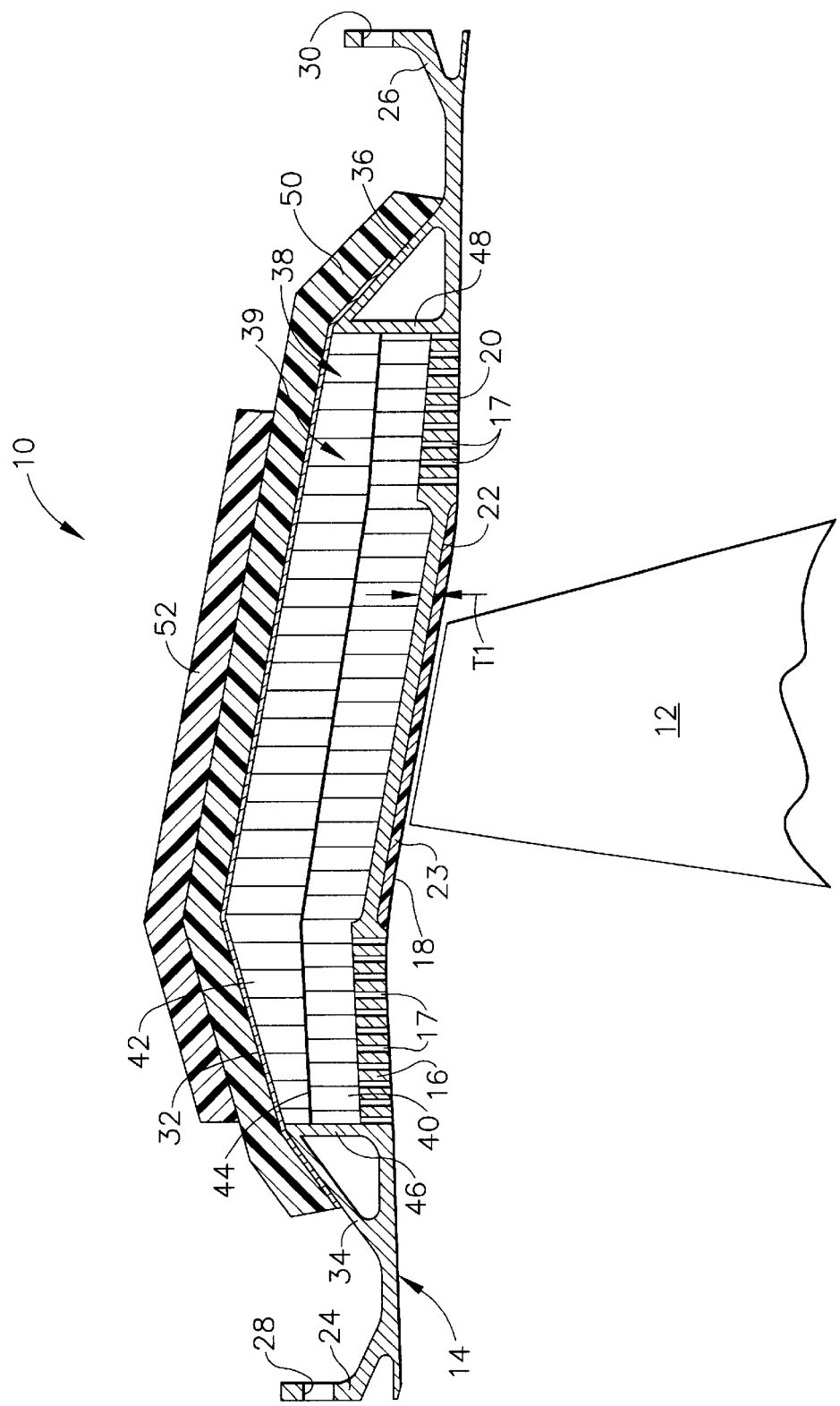
FIG. 1 is a half cross-sectional view of a portion of a fan casing constructed in accordance with the present invention.

Referring to the drawings wherein identical reference numerals denote the same elements throughout the various views, FIG. 1 shows a fan casing 10 surrounding a plurality of fan blades 12, which are mounted to a disk rotatable about a longitudinal axis (not shown). The casing 10 has an annular metallic inner shell 14 which is a continuous structure encircling the blades 12 and having, sequentially from front to rear, a forward section 16, a middle section 18, and an aft section 20. The middle section 18 axially spans the tips of the blades 12 and may include an annular pocket 22 adapted to receive a known abradable material 23, which is a material capable of being worn away in the event that the tip of a fan blade 12 contacts the abradable material 23. The inner shell 14 may be made from any suitable alloy including but not limited to steel, titanium, or aluminum. A plurality of holes 17 are formed through the thicknesses of the forward section 16 and the aft section 20. The function of the holes 17 is described in more detail below. A forward mounting flange 24 having a plurality of circumferentially spaced bolt holes 28 is formed at the forward end of the inner shell 14, and an aft mounting flange 26 having a plurality of circumferentially spaced bolt holes 30 is formed at the aft end of the inner shell 14. The inner shell 14 has integral flanges 34 and 36 which extend radially outward and meet the forward and aft ends of an outer shell 32, which may be a sheet metal member.

A circumferentially extending cavity 38 is defined by the outer shell 32, the integral flanges 34 and 36, and the inner shell 14. Modification of the configuration of the outer shell 32 and modification, or even elimination, of the integral flanges 34 and 36 is acceptable, so long as a closed cavity 38 is present between the inner shell 14 and the outer shell 32. Radially extending bulkheads 46 and 48 are disposed at the forward and aft ends, respectively, of the cavity 28 and extend from the inner shell 14 to the outer shell 32. An acoustic absorber 39 is disposed in the cavity 38. In the illustrated example the acoustic absorber 39 is a two degree-of-freedom (2-DOF) resonator-type absorber comprising a first cellular layer 40 disposed in the cavity 38 adjacent to the inner shell 14, a perforated annular septum 44 surrounding the first cellular layer 40, and a second cellular layer 42 surrounding the perforated septum 44. Other known types of acoustic absorbers may be used, for example single a degree-of-freedom (1-DOF) resonator, as described below, or a bulk absorber such as a fibrous or rigid foam material (not shown). First and second layers 50 and 52 of a ballistic material, such as KEVLAR aramid fibers, are wrapped around the outer shell 32.

Figure 5:
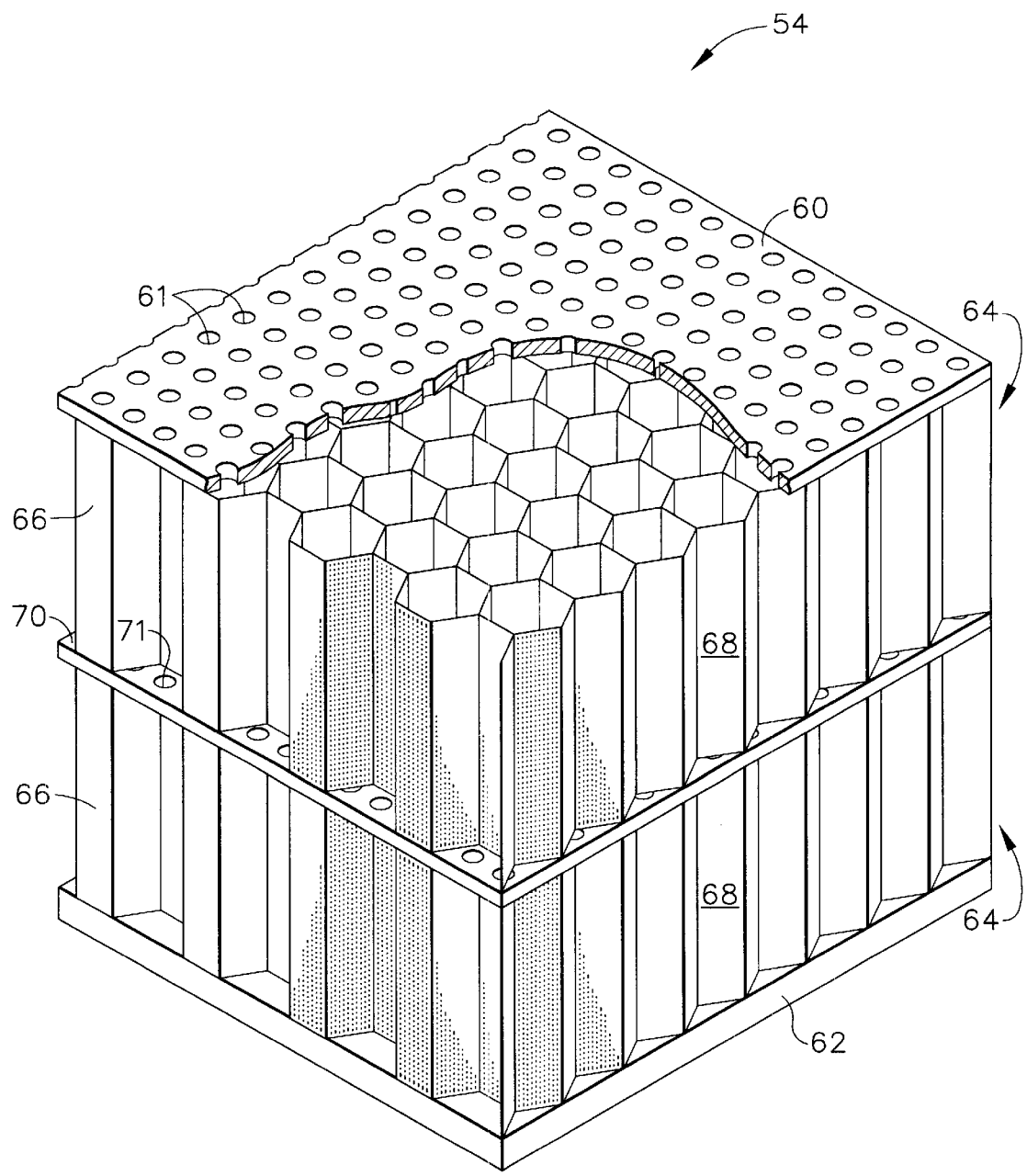
FIG. 5 is a perspective view of a portion of a generalized acoustic absorber panel.

FIG. 5 is a perspective view of a portion of a generalized 2-DOF resonator acoustic absorber 54 that is representative of the construction of the acoustic absorber 39 of FIG. 1. The generalized acoustic absorber 54 is described in detail here to illustrate the acoustic configuration of the acoustic absorber 39. The absorber 54 includes a perforated facesheet 60 having a plurality of holes 61 formed therein, a backplate 62 generally parallel to and spaced apart from the facesheet 60, and an acoustic filler 64 therebetween formed by a number of compartments or cells 66. Each cell 66 is defined by walls 68. While the cells 66 are each depicted as being formed by six walls 68 so as to have a hexagonal cross-sectional shape that yields a honeycomb-like cell pattern, the cells 66 could be formed by any number of walls 68 to have any desired shape. A perforated septum 70 having a plurality of holes 71 formed therein is disposed between and parallel to the facesheet 60 and the backplate 62. In a 1-DOF resonator (not shown), the perforated septum 60 is omitted.

The dimensional characteristics of the facesheet 60, backplate 62 and cells 66 will determine the acoustical properties of the absorber 54. In particular, the thickness of the facesheet 60, the diameters of the holes 61, and the open area ratio of the facesheet 60 resulting from the holes 61 are specified according to known acoustic design methods. Furthermore, the depth and cross-sectional area of each cell 66 and the thickness of the cell walls 68 are determined according to known acoustic design principles.

Referring again to FIG. 1, the fan casing 10 of the present invention comprises components corresponding to those of the generalized absorber 54 including the outer shell 32 corresponding to the backplate 62, the layers of cellular material 40 and 42 corresponding to the cells 66, and the perforated septum 44 corresponding to the septum 70. The inner shell 14 serves both as a containment feature and as a facesheet similar to the facesheet 60 of the generalized absorber structure 54. Specifically, the inner shell 14 has a thickness sufficient to retard the passage of a released blade 12 or blade fragment. For example, where the inner shell 14 is made of an aluminum alloy, it may have a thickness T1 of about 0.5 cm (0.2 in.) The holes 17 serve to admit sound pressure to the above-describe acoustic absorber structure. The addition of the holes 17 weakens the inner shell 14 from a containment perspective. Therefore, the forward and aft sections 16 and 20 are thickened relative to the middle section 18 to compensate for the presence of the holes 17 therein. The quantity, spacing, and diameter of the holes 17 are selected to satisfy the acoustic design parameters dictated by the acoustic absorption function as described above.

Figure 2:
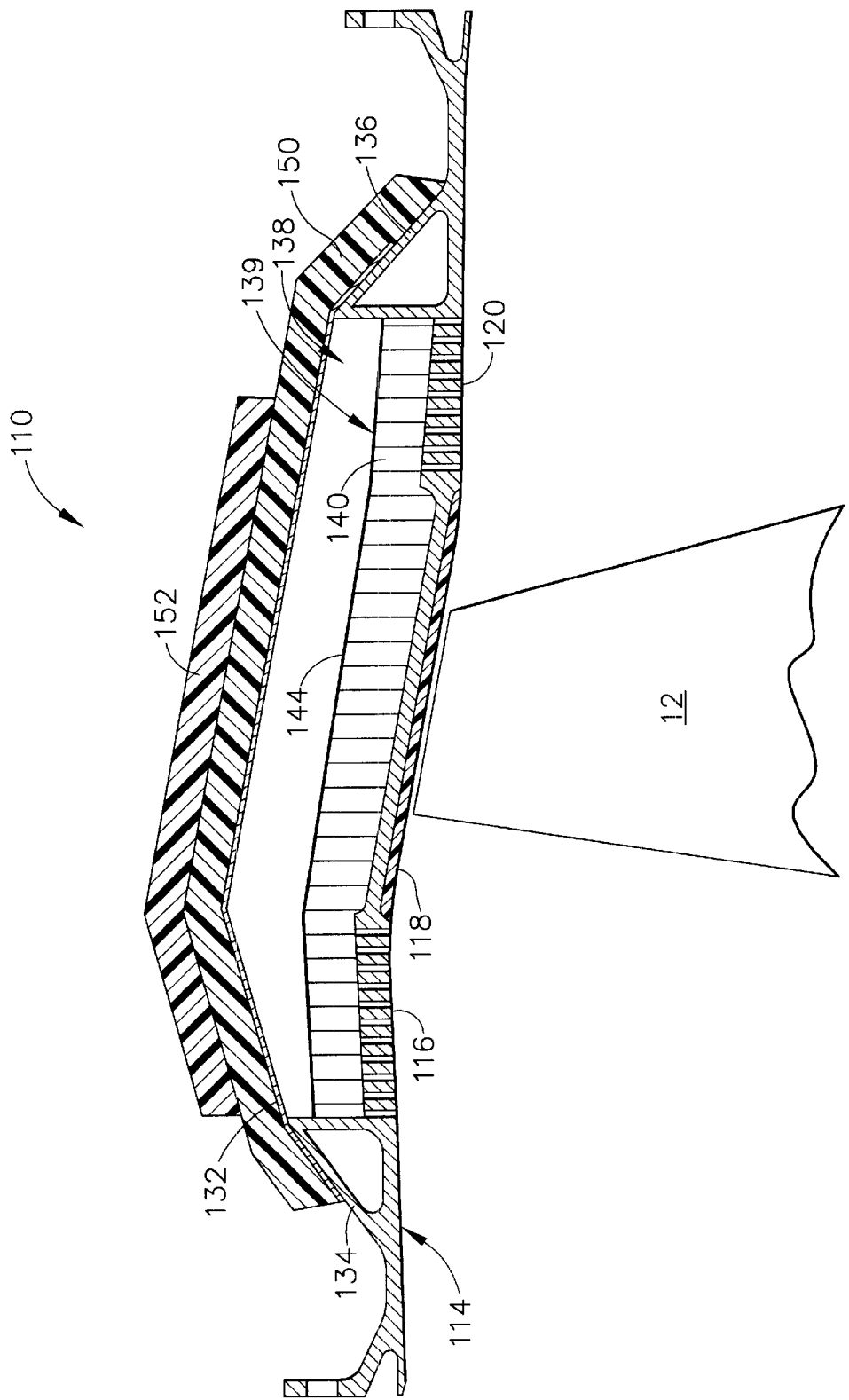
FIG. 2 is a half cross-sectional view of a variation of the fan casing of FIG. 1.

A variation of the invention is illustrated in FIG. 2. A fan casing 110 has a structure generally identical to that of the fan casing 10 of FIG. 1, including an inner shell 114 having forward, middle, and aft sections 116, 118, and 120, an outer shell 132 cooperating with the inner shell 114 and flanges 134 and 136 to define a cavity 138 having an acoustic absorber 139 disposed therein, and first and second layers 150 and 152 of a ballistic material. In this example the absorber structure is a 1-DOF resonator. A single layer 140 of cellular material, such as a honeycomb structure, is disposed around the outside of the inner shell 114. In the illustrated example the perforated septum 44 of the 2-DOF resonator is eliminated. However, a non-perforated septum 144 may be used if needed to define the height of the cellular layer 140, that is, if the required height of the cells for acoustic purposes is less than the radial height of the cavity 138, the septum 144 can be placed at the desired position to obtain the proper height for the 1-DOF system.

Figure 3:
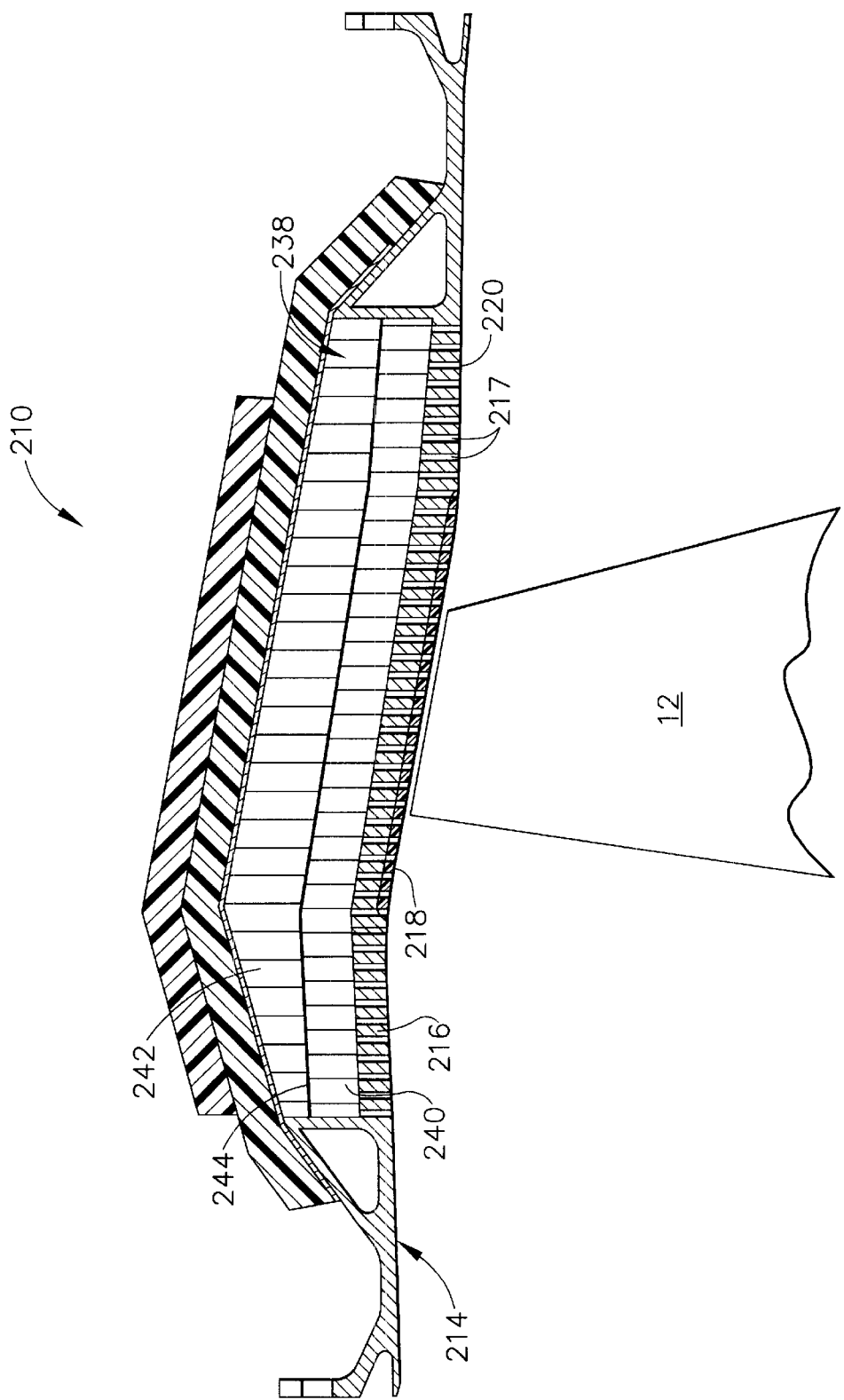
FIG. 3 is a half cross-sectional view of a fan casing constructed in accordance with an alternate embodiment of the present invention.

An alternate embodiment of the invention is illustrated in FIG. 3. A fan casing 210 is similar to fan casing 10 and includes an annular metallic inner shell 214 including forward, middle, and aft sections 216, 218, and 220. In this embodiment the middle section 218 also contains a plurality of holes 217 in addition to those formed in the forward and aft sections 216 and 220. The middle section 218 is also of an increased thickness relative to the non-perforated middle section 16 illustrated in FIG. 1 in order to recover the strength lost through the presence of the holes 217. In the illustrated example the fan casing 210 includes a 2-DOF resonator absorber including first and second cellular layers 240 and 242 separated by a perforated septum 244, although a 1-DOF resonator or a bulk absorber could also be used.

Figure 4:
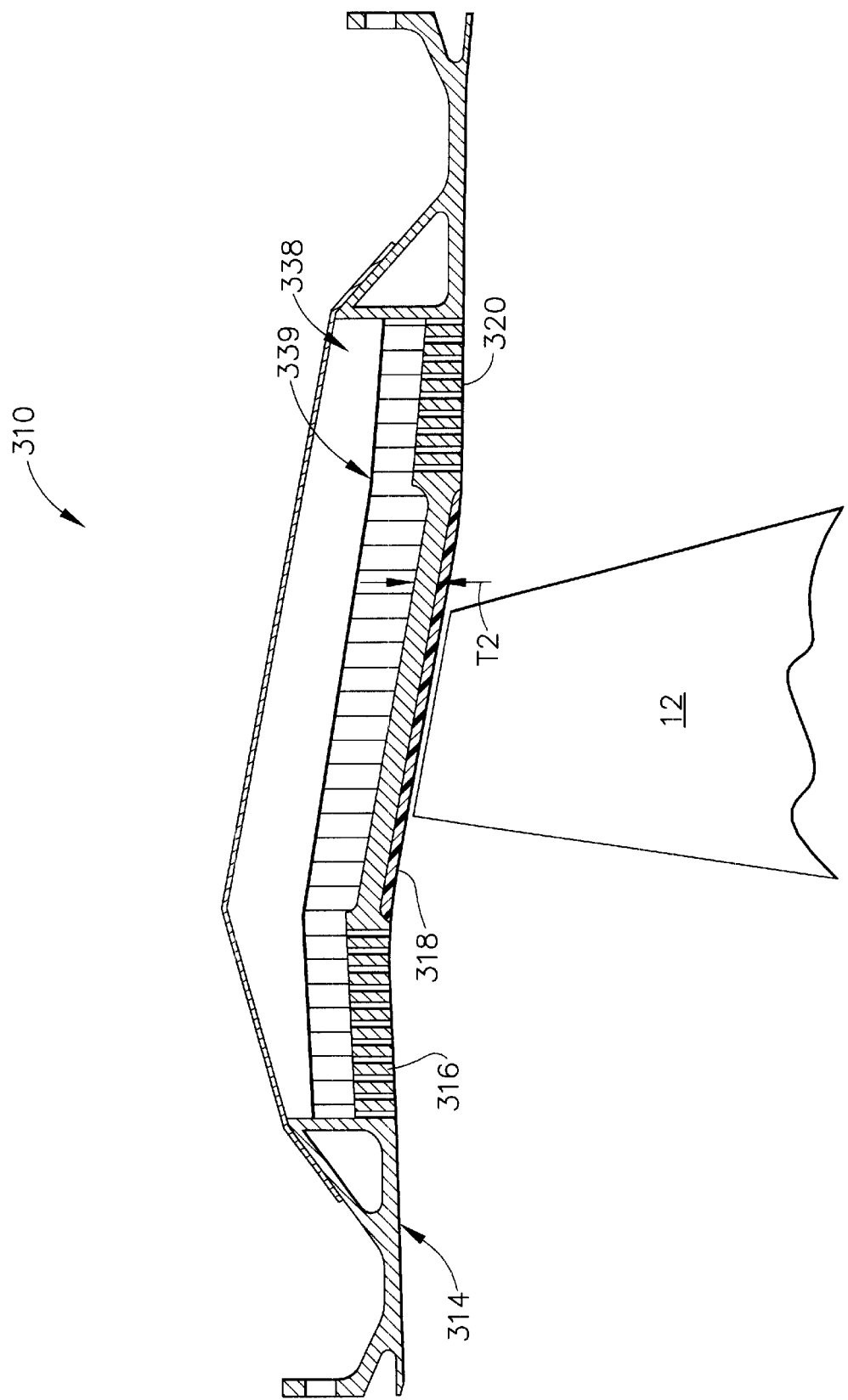
FIG. 4 is a half cross-sectional view of a fan casing constructed in accordance with another alternate embodiment of the present invention.

The primary containment capability of the fan casing designs described above is provided by the layers of ballistic material wrapped around the outer shell of the casing. The inner shell retards the passage of released blades or blade fragments and therefore contributes to the containment function, which allows the use of less ballistic material than would otherwise be required. However, in yet another embodiment, the present invention could also be incorporated in a hardwall-only containment system in which the entire inner shell is of sufficient thickness to resist penetration by a released blade fragment without the assistance of other structure. In this embodiment, shown in FIG. 4, the structure of a fan casing 310 is similar to that illustrated in FIGS. 1, 2, and 3, except that the layers of ballistic material 50 and 52 are eliminated. Accordingly, the inner shell 314 has a thickness T2 sufficient to completely resist penetration by a released fan blade or fragment thereof, for example about 2.54 cm (1.0 in.). An acoustic absorber 339 is disposed in the cavity 338 between the inner shell 314 and the outer shell 332. The absorber 339 may be a 2-DOF or 1-DOF resonator (shown), or a bulk absorber as described above with respect to the other embodiments of the invention.

The foregoing has described a fan casing for a gas turbine engine which combines the functions of blade containment and noise suppression. The fan casing has an annular metallic inner shell with a plurality of holes are formed therethrough. An acoustic absorber, such as a cellular resonator, is disposed around the inner shell. While specific embodiments of the present invention have been described, it will be apparent to those skilled in the art that various modifications thereto can be made without departing from the spirit and scope of the invention as defined in the appended claims.

What is claimed is:

1. A fan casing comprising:

an annular metallic inner shell having forward, middle, and aft sections, said forward and aft sections having an increased thickness relative to that of said middle section, wherein a plurality of holes are formed through said forward and aft sections;

an annular outer shell surrounding and spaced apart from said inner shell so as to define a circumferentially extending cavity; and an acoustic absorber disposed around said inner shell.

2. The fan casing of claim 1 wherein said acoustic absorber comprises an annular first layer of cellular material disposed around said inner shell.

3. The fan casing of claim 2 further comprising an annular septum disposed around said first layer of cellular material.

4. The fan casing of claim 3 further comprising an annular second layer of cellular material disposed around said septum, wherein said septum is perforated.

5. The fan casing of claim 1 further comprising at least one layer of a ballistic material disposed around said outer shell.

6. The fan casing of claim 1 wherein a plurality of holes are formed in said middle section of said inner shell.

7. A fan assembly comprising:

a plurality of blades mounted to a disk rotatable about an axis;

an annular metallic inner shell surrounding said plurality of blades, said inner shell having a thickness sufficient to resist penetration by a blade released from said disk, wherein a plurality of holes are formed through said inner shell;

an annular outer shell surrounding and spaced apart from said inner shell so as to define a circumferentially-extending cavity; and an acoustic absorber disposed around said inner shell.

8. The fan casing of claim 7 wherein said acoustic absorber comprises an annular first layer of cellular material disposed around said inner shell.

9. The fan casing of claim 8 further comprising an annular septum disposed around said first layer of cellular material.

10. The fan casing of claim 9 further comprising an annular second layer of cellular material disposed around said septum, wherein said septum is perforated.

11. The fan casing of claim 7 further comprising at least one layer of a ballistic material disposed around said outer shell.

12. The fan casing of claim 7 wherein a plurality of holes are formed in said middle section of said inner shell.

* * * * *